United States Patent Office 3,254,131
Patented May 31, 1966

3,254,131
CATALYTIC SYNTHESIS OF CONDENSATION PRODUCTS FROM MERCAPTANS
Phillip S. Landis, Woodbury, N.J., assignor to Socony Mobil Oil Company, Inc., a corporation of New York
No Drawing. Filed Aug. 11, 1961, Ser. No. 130,758
7 Claims. (Cl. 260—613)

This invention relates to an improved catalytic method for preparing condensation products characterized by an ethylenic linkage from organic mercaptans, the alpha carbon atom of which has at least one hydrogen atom attached thereto. More particularly, the present invention is directed to a method for synthesis of the foregoing products carried out in the presence of a catalyst consisting essentially of a specified crystalline aluminosilicate salt.

It has heretofore been proposed to prepare condensation products of the above type from designated mercaptans in the presence of a catalyst of a sulfide or oxide of molybdenum, cobalt, iron, silver, copper, manganese, lead or nickel. Such method while effective in achieving the desired products has had the disadvantages of requiring careful control of the reaction conditions and the resultant production of a comparatively small yield of product.

The present invention affords an improved process for producing the desired condensation products, including for example, stilbene and derivatives thereof. The process of the invention involves contacting a mercaptan having the general formula:

where R and R' are members selected from the group consisting of hydrogen, aryl, aralkyl and alkyl, wherein the latter two members have atoms other than labile hydrogen attached to the carbon atom connected to the mercaptyl carbon atom. Contact is carried out within the approximate range of 150 to 350° C. with a crystalline aluminosilicate salt having rigid three-dimensional networks made up of unit cells characterized by the substantial absence of change in unit cell dimensions on dehydration and rehydration and uniform pores having a diameter within the range of about 3 to about 15 Angstrom units. The above catalyst requirements are fulfilled by certain crystalline zeolites known as molecular sieves. A high yield of product is obtained by the method of the present invention in accordance with the equation:

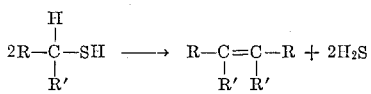

It has been found that with the use of the above described catalyst the mercaptan condensation reaction proceeds rapidly with high selectivity to produce a commercially attractive yield of product. The temperature employed broadly is within the approximate range of 150 to 350° C. Preferably, the reaction temperature is between about 200° C. and about 300° C. The reaction is generally carried out under substantially atmospheric pressure although the reaction pressure may range between about 5 and about 100 p.s.i.g.

The organic mercaptan undergoing reaction in accordance with the method of the invention is one essentially characterized by having a hydrogen atom attached to the alpha carbon atom thereof and an atom other than a labile hydrogen atom attached to the beta carbon atom thereof. Such mercaptan compounds may be designated by the formula:

where R and R' are hydrogen, aryl, aralkyl or alkyl groups, the latter two being characterized by the absence of a labile hydrogen atom attached to the carbon atom connected to the mercaptyl carbon. The aryl, aralkyl and alkyl groups may contain as substituents, for example, halogen, nitro, amino, hydroxyl or alkoxy components. Labile hydrogen is accorded the usual significance attributed this term, i.e., hydrogen which is easily thermally removable. The presence of labile hydrogen attached to the carbon atom connected to the mercaptyl carbon results in elimination of hydrogen sulfide from the mercaptan with the formation of a double bond rather than giving the desired condensation reaction.

In one embodiment, the method described herein has been found to be particularly applicable in preparation of stilbene and derivatives thereof. For such purposes, benzyl mercaptan or substituted benzyl mercaptan having the formula:

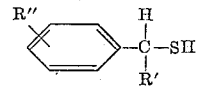

where R' has the above designated significance and R'' is a substituent selected from the group consisting of aryl, alkoxy, halogen, hydroxyl, nitro, amino, alkyl and hydrogen components undergoes condensation in accordance with the following equation:

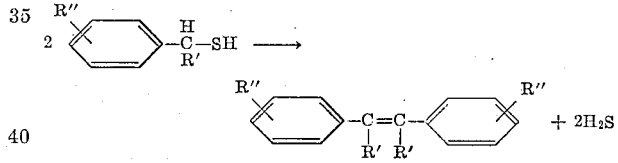

Representative organic mercaptans which may effectively undergo catalytic condensation in accordance with the method described herein include by way of example: benzyl mercaptan; p-methoxybenzyl mercaptan; cinnamyl mercaptan; 1-mercaptomethylnaphthalene; 2-mercaptomethylthiophene, benzhydryl mercaptan, neopentyl mercaptan, 2-mercaptomethylpyridine, p-chlorobenzyl mercaptan, 1,4-di-mercapto methylbenzene, alpha-chlorobenzyl mercaptan, allyl mercaptan, and p-phenylbenzyl mercaptan.

The aluminosilicate salts employed as catalysts in the process of this invention are essentially dehydrated forms of crystalline siliceous zeolites containing varying quantities of sodium, calcium, and aluminum with or without other metals. All or a portion of the sodium and calcium ions normally contained in the zeolite structure may be replaced with a number of other ions. The atoms of sodium, calcium or other metals in replacement thereof, silicon, aluminum and oxygen, are arranged in a definite and consistent crystalline pattern. Such structures contain a large number of small cavities interconnected by a number of still smaller channels. These cavities and channels are precisely uniform in size. Chemically, these zeolites may be represented by the general formula:

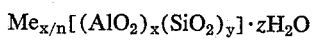

where Me is a metal cation, $x/n$ is the number of exchangeable metal cations of valence $n$, $x$ is also the number of aluminum ions combined in the form of aluminate, $y$ is the number of silicon atoms and $z$ is the number of water molecules, removal of which produces the characteristic channel system. In the above formula, the ratio $y/x$ is a number from 1 to 5 and usually from 1 to 2. Zeolites having the above characteristics have been referred to as molecular sieves. At the present time, there are commercially available molecular sieves of the "A" series and of the "X" series. A synthetic zeolite known as "Molecular Sieve 4A" is a crystalline sodium aluminosilicate having channels about 4 Angstroms in diameter. In hydrated form, this material is chemically characterized by the formula:

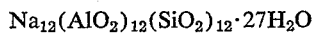

$$Na_{12}(AlO_2)_{12}(SiO_2)_{12} \cdot 27H_2O$$

The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the ratio of one calcium ion for two sodium ions. A crystalline sodium aluminosilicate which has pores or channels of approximately 13 Angstrom units in diameter is also available commercially under the name "Molecular Sieve 13X." The letter "X" as used to distinguish the interatomic structure of this zeolite from that of the "A" crystals mentioned above. As prepared, the 13X material contains water and has the unit cell formula:

$$Na_{86}[(AlO_2)_{86}(SiO_2)_{106}] \cdot 267H_2O$$

The parent zeolite is dehydrated to make the active catalyst. The 13X crystal is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels about 10 Angstrom units in diameter and in which a substantial proportion of the sodium ions of the 13X material have been replaced by calcium.

Molecular sieves of the "X" series are characterized by the formula:

$$M_{86/n}[(AlO_2)_{86}(SiO_2)_{106}] \cdot 267H_2O$$

where M is $Na^+$ or $Ca^{++}$ or other alkali metal or alkaline earth metal ions introduced by replacement thereof and $n$ is the valence of the cation M. The structure consists of a complex assembly of 192 tetrahedra in a large cubic unit cell 24.95 A. on an edge. The effective pore diameter is 10 to 13 A. and the adsorption volume is about 0.35 cc./gram of dehydrated zeolite.

For molecular sieves of this series, in the empirical formula:

$$M_{2/n}O \cdot Al_2O_3 \cdot XSiO_2 \cdot YH_2O$$

X has an average value of $2.5 \pm 0.5$. The value of Y, depending on the condition of hydration and on the metal cation present may vary from 8 to 0. The average value of Y for the completely hydrated sodium zeolite of the "X" series is 6.2.

Under the conditions of the method described hereinabove, crystalline aluminosilicate salts having a uniform structure characterized by pores having a diameter within the approximate range of 3 to 15 Angstrom units are employed. Particular preference is accorded the crystalline aluminosilicate salts having an effective pore diameter of between about 8 and about 13 Angstrom units.

It is contemplated that the organic mercaptan reactant may be contacted with the crystalline aluminosilicate catalyst under the requisite temperature conditions in any feasible manner. One suitable system involves packing a column with particles of the catalysts, heating the catalyst bed to a temperautre in the range of about 150 to 350° C. and passing the mercaptan reactant through the heated catalyst bed either as a liquid or in the form of a vapor. The resulting condensation product, any unreacted mercaptan and other by-products are collected while $H_2S$ is vented to the atmosphere or contacted with a suitable adsorbent medium. Preferably, an inert gas is passed through the reaction mass and is employed to strip reaction product and carry it therefrom to a condensing zone. Suitable stripping gases include nitrogen, carbon dioxide and ammonia. The reaction product can be condensed directly to solid form. The crystals so obtained are readily separated from remaining components of the reaction mixture by centrifuging or filtration and may thereafter, if desired, be recrystallized from a suitable solvent.

The following examples will serve to illustrate the method of this invention without limiting the same:

*Example 1*

Ninety-five (95) grams of benzyl mercaptan was added dropwise to a vertical reactor tube packed with 30 cc. of a catalyst of 13X sodium aluminosilicate maintained at a temperature of 250–255° C. The catalyst had previously been flushed with nitrogen to remove moisture and air. The mercaptan was added over a period of 2¼ hours. After the addition was completed, nitrogen was again passed over the catalyst to displace all adsorbed products. The products collected amounted to 74 grams and constituted a mixture of solid and red oil.

The solid separated by filtration amounted to 41 grams and had a melting point of 117–121° C. Recrystallization of the solid from ethanol raised the melting point of the solid to 123–124° C. An authentic sample of trans-stilbene had a similar melting point and gave no melting point depression on admixture with the solid sample derived above. Also, the infrared spectra of a sample of the product and trans-stilbene were identical.

The red oil from the reaction product mixture was subjected to vapor phase chromatographic analysis and found to contain 14 percent by weight of trans-stilbene. The total conversion of benzyl mercaptan to trans-stilbene accordingly amounted to 67 percent of the theoretical yield.

The reaction taking place is shown by the following equation:

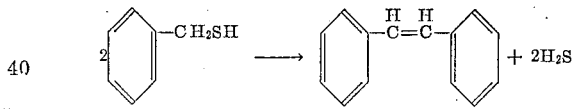

*Example 2*

Employing a system and technique similar to that of Example 1, 75 grams of p-methoxybenzyl mercaptan was passed over a bed of 30 cc. of a catalyst of 13X sodium aluminosilicate at a temperature of 250–260° C. The products collected constituted a mixture of solid and oil. The solid was separated from the oily product by filtration yielding 37 grams (64 percent yield) of solid having a melting point of 210–214° C. Recrystallization of this solid from methanol yielded white crystals having a melting point of 213–214° C. The melting point of bis-p-methoxystilbene is 214–215° C. The reaction taking place is shown by the following equation:

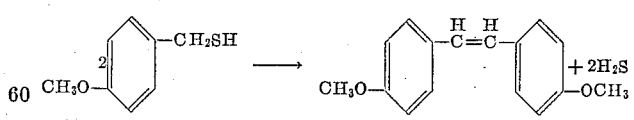

*Example 3*

Utilizing a system similar to that of the foregoing examples, 45 grams of benzyl mercaptan was passed over a bed of 25 grams of a catalyst of 4A sodium aluminosilicate at a temperature of about 250° C. A yield of 10.5 grams of stilbene was separated from the reaction product mixture.

For purposes of comparison with the examples illustrative of the method of the invention, the following Examples 4 and 5 were carried out utilizing as catalyst alumina and molybdenum disulfide respectively in place of the crystalline aluminosilicate catalysts described hereinabove.

Example 4

Employing a system similar to that of the foregoing examples, 37 grams of benzyl mercaptan was passed over a bed of 30 grams of tabular alumina at a temperature of about 250° C. A yield of only 0.7 gram of stilbene was found in the reaction product mixture.

Example 5

Employing a system similar to that of the foregoing examples, 106 grams of benzyl mercaptan was passed over a bed of 20 grams of molybdenum disulfide at a temperature of about 250° C. A yield of 9.0 grams of stilbene was found in the reaction product mixture.

The results of Examples 1, 3, 4 and 5 are summarized below:

| Example | Wt. of Benzyl Mercaptan (grams) | Catalyst | Stilbene | |
|---|---|---|---|---|
| | | | Wt. in grams | Yield |
| 1 | 95 | 25 g. 13X | 46.0 | 67 |
| 3 | 45 | 25 g. 4A | 10.5 | 38 |
| 4 | 37 | 30 g. Al$_2$O$_3$ | 0.7 | 3 |
| 5 | 106 | 20 g. MoS$_2$ | 9.0 | 12 |

It will be seen from the foregoing data that the crystalline aluminosilicate catalysts employed in the present process afforded a distinct improvement in yield of product obtained over other materials heretofore suggested as catalysts for the subject reaction.

Example 6

A reactor was packed with 10 grams of a catalyst of 10X calcium aluminosilicate and heated to 300° C. A solution of 10 grams of 1-mercaptomethylnaphthalene and 20 ml. of benzene was passed over the heated catalyst in 20 minutes. An additional 50 ml. of benzene was passed through the reactor at 300° C. to displace adsorbed reaction products. The condensed product collected consisted of benzene and reaction products. Hydrogen sulfide was vented to the atmosphere during the reaction. Evaporation of the benzene on a steam bath yielded 8 grams of viscous residue which partially crystallized on standing. Yellow crystals in the amount of 1.2 grams were separated by vacuum filtration. An additional 0.9 gram of crystals were obtained from the filtrate. The crystals upon recrystallization from ethanol were shown by analysis to be di-alphanaphthylethylene. The reaction taking place is depicted by the following equation:

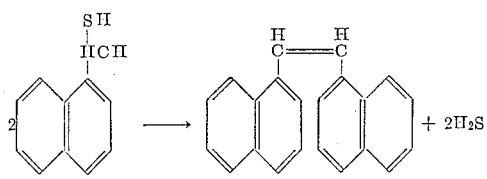

Example 7

A reactor was packed with 15 grams of a catalyst of 5A calcium aluminosilicate and heated to 300° C. A solution of 7.5 grams of cinnamyl mercaptan and 30 ml. of benzene was passed over the catalyst in 30 minutes. An additional 30 ml. of benzene was passed through the reactor at 300° C. in order to displace any adsorbed product. The condensed product collected consisted of benzene and reaction products. Hydrogen sulfide was vented to the atmosphere. Evaporation of the benzene yielded 6 grams of viscous red oil. Dilution of this oily product with methanol precipitated a yellow solid, which upon recrystallization from chloroform was found to have a melting point of 195° C. Analysis established this product to be 1,6-diphenyl-hexatriene. The reaction taking place is shown by the following equation:

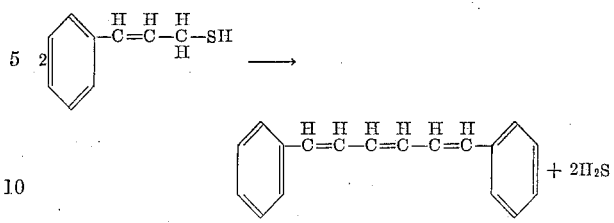

The condensation products obtained in accordance with the method described herein are useful in the manufacture of dyestuffs, pharmaceuticals and organic intermediates.

It is to be understood that the above description is merely illustrative of preferred embodiments of the invention, of which many variations may be made by those skilled in the art without departing from the spirit thereof.

I claim:

1. A method for preparing a condensation product characterized by an ethylenic linkage which comprises contacting an organic mercaptan selected from the group consisting of cinnamyl mercaptan, and a mercaptan having the formula:

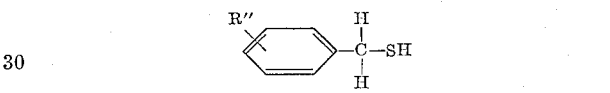

where R″ is a member selected from the group consisting of aryl, alkoxy, halogen, hydroxyl, nitro, alkyl, amino and hydrogen at a temperature within the approximate range of 150 to 350° C. with a crystalline aluminosilicate salt consisting essentially of the dehydrated form of a zeolite characterized by the formula:

$$\text{Me}_{x/n}[(\text{AlO}_2)_x(\text{SiO}_2)_y] \cdot z\text{H}_2\text{O}$$

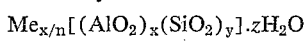

where Me is an alkali metal or alkaline earth metal cation, $x$ is the number of aluminum ions combined in the form of aluminate, $x/n$ is the number of exchangeable metal cations of valence $n$, $y$ is the number of silicon atoms, $y/x$ is a number from 1 to 5 and $z$ is the number of water molecules, removal of which produces a characteristic channel system having rigid three-dimensional networks made up of unit cells characterized by the substantial absence of change in unit cell dimensions on dehydration and rehydration and uniform pores having a diameter within the approximate range of 3 to 15 Angstrom units.

2. The method of claim 1, wherein the temperature is within the approximate range of 200 to 300° C. and the crystalline aluminosilicate is characterized by uniform pores having a diameter within the approximate range of 8 to 13 Angstrom units.

3. A method for preparing a condensation product characterized by an ethylenic linkage from an organic mercaptan selected from the group consisting of benzyl mercaptan, p-methoxybenzyl mercaptan, cinnamyl mercaptan, 1-mercaptomethylnaphthalene, 2-mercaptomethylthiophene, benzhydryl mercaptan, neopentyl mercaptan, 2-mercaptomethylpyridine, p-chlorobenzyl mercaptan, 1,4-di-mercapto methylbenzene, alpha-chlorobenzyl mercaptan, allyl mercaptan and p-phenylbenzyl mercaptan, which comprises contacting said mercaptan at a temperature within the approximate range of 150 to 350° C. with a crystalline aluminosilicate salt consisting essentially of the dehydrated form of a zeolite characterized by the formula:

$$\text{Me}_{x/n}[(\text{AlO}_2)_x(\text{SiO}_2)_y] \cdot z\text{H}_2\text{O}$$

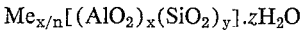

where Me is an alkali metal or alkaline earth metal cation, $x$ is the number of aluminum ions combined in the form of aluminate, $x/n$ is the number of exchangeable metal cations of valence $n$, $y$ is the number of silicon atoms, $y/x$ is a number from 1 to 5 and $z$ is the number of water molecules, removal of which produces the characteristic channel system and having rigid three-dimensional networks made up of unit cells characterized by the substantial absence of change in unit cell dimensions on dehydration and rehydration and uniform pores having a diameter within the approximate range of 3 to 15 Angstrom units.

4. A method for preparing stilbene which comprises contacting benzyl mercaptan at a temperature within the approximate range of 150 to 350° C. with a crystalline aluminosilicate salt consisting essentially of the dehydrated form of a zeolite characterized by the formula:

$$Me_{x/n}[(AlO_2)_x(SiO_2)_y] \cdot zH_2O$$

where Me is an alkali metal or alkaline earth metal cation, $x$ is the number of aluminum ions combined in the form of aluminate, $x/n$ is the number of exchangeable metal cations of valence $n$, $y$ is the number of silicon atoms, $y/x$ is a number from 1 to 5 and $z$ is the number of water molecules, removal of which produces the characteristic channel system and having rigid three-dimensional networks made up of unit cells characterized by the substantial absence of change in unit cell dimensions on dehydration and rehydration and uniform pores having a diameter within the approximate range of 3 to 15 Angstrom units.

5. A method for preparing bis-p-methoxystilbene which comprises contacting p-methoxybenzyl mercaptan at a temperature within the approximate range of 150 to 350° C. with a crystalline aluminosilicate salt consisting essentially of the dehydrated form of a zeolite characterized by the formula:

$$Me_{x/n}[(AlO_2)_x(SiO_2)_y] \cdot zH_2O$$

where Me is an alkali metal or alkaline earth metal cation, $x$ is the number of aluminum ions combined in the form of aluminate, $x/n$ is the number of exchangeable metal cations of valence $n$, $y$ is the number of silicon atoms, $y/x$ is a number from 1 to 5 and $z$ is the number of water molecules, removal of which produces the characteristic channel system and having rigid three-dimensional networks made up of unit cells characterized by the substantial absence of change in unit cell dimensions on dehydration and rehydration and uniform pores having a diameter within the approximate range of 3 to 15 Angstrom units.

6. A method for preparing di-alpha-naphthylethylene which comprises contacting 1-mercaptomethylnaphthalene at a temperature within the approximate range of 150 to 350° C. with a crystalline aluminosilicate salt consisting essentially of the dehydrated form of a zeolite characterized by the formula:

$$Me_{x/n}[(AlO_2)_x(SiO_2)_y] \cdot zH_2O$$

where Me is an alkali metal or alkaline earth metal cation, $x$ is the number of aluminum ions combined in the form of aluminate, $x/n$ is the number of exchangeable metal cations of valence $n$, $y$ is the number of silicon atoms, $y/x$ is a number from 1 to 5 and $z$ is the number of water molecules, removal of which produces the characteristic channel system and having rigid three-dimensional networks made up of unit cells characterized by the substantial absence of change in unit cell dimensions on dehydration and rehydration and uniform pores having a diameter within the approximate range of 3 to 15 Angstrom units.

7. A method for preparing 1,6-diphenyl-hexatriene which comprises contacting cinnamyl mercaptan at a temperature within the approximate range of 150 to 350° C. with a crystalline aluminosilicate salt consisting essentially of the dehydrated form of a zeolite characterized by the formula:

$$Me_{x/n}[(AlO_2)_x(SiO_2)_y] \cdot zH_2O$$

where Me is an alkali metal or alkaline earth metal cation, $x$ is the number of aluminum ions combined in the form of aluminate, $x/n$ is the number of exchangeable metal cations of valence $n$, $y$ is the number of silicon atoms, $y/x$ is a number from 1 to 5 and $z$ is the number of water molecules, removal of which produces the characteristic channel system and having rigid three-dimensional networks made up of unit cells characterized by the substantial absence of change in unit cell dimensions on dehydration and rehydration and uniform pores having a dimeter within the approximate range of 3 to 15 Angstrom units.

References Cited by the Examiner

UNITED STATES PATENTS 2,645,671   7/1953   Mattano _____ 260—668
2,971,903   2/1961   Kimberlin et al. _____ 208—119

OTHER REFERENCES

Chemical Abstracts, vol. 45 (1951), 7514–7515.
Tits-Skvortsova et al., Zhur. Obshchei Khim., vol. 21 (1951), pages 242–250.

LEON ZITVER, *Primary Examiner.*

ALPHONSO D. SULLIVAN, *Examiner.*